(12) United States Patent
Kwon

(10) Patent No.: US 6,798,674 B2
(45) Date of Patent: Sep. 28, 2004

(54) HALF-BRIDGE CONVERTER WITH HIGH POWER FACTOR

(75) Inventor: Bong-Hwan Kwon, Pohang (KR)

(73) Assignee: Postech Foundation (KR)

( * ) Notice: Subject to any disclaimer, the term of this patent is extended or adjusted under 35 U.S.C. 154(b) by 0 days.

(21) Appl. No.: 10/273,117

(22) Filed: Oct. 18, 2002

(65) Prior Publication Data

US 2003/0076699 A1 Apr. 24, 2003

(30) Foreign Application Priority Data

Oct. 20, 2001 (KR) ......................................... 2001-64936

(51) Int. Cl.$^7$ .............................. H02J 1/02; H02M 5/45
(52) U.S. Cl. .......................... 363/39; 363/37; 363/132
(58) Field of Search ........................... 363/127, 98, 97, 363/132, 89

(56) References Cited

U.S. PATENT DOCUMENTS 6,034,489 A * 3/2000 Weng ......................... 315/307
6,608,770 B2 * 8/2003 Vinciarelli et al. ........... 363/61

OTHER PUBLICATIONS

H.-L. Do et al., "Single-Stage Electronic Ballast With Unity Power Factor," IEE Proc.-Electr. Power Appl., 148(2):171–176, Mar. 2001.

* cited by examiner

Primary Examiner—Rajnikant B. Patel
(74) Attorney, Agent, or Firm—Rothwell, Figg, Ernst & Manbeck, p.c.

(57) ABSTRACT

A half-bridge converter having an improved power factor is provided. The half-bridge converter has a bridge diode unit for providing a current path to a power factor improving unit and transmitting energy to a voltage smoothing capacitor; the voltage smoothing capacitor for storing energy provided by the bridge diode unit; and a switching unit having two switches serially connected between both ends of the voltage smoothing capacitor, in which the power factor improving unit for feeding the voltage of the common connection point of the switches forming the switching unit back to the common connection point of the input capacitors so as to change an input current according to the magnitude of the input voltage is further included. According to the half-bridge converter, conducting loss occurring in the switching unit decreases and the power factor of the input terminal is improved.

5 Claims, 7 Drawing Sheets

(a)

(b)

(c)

HALF-BRIDGE CONVERTER WITH HIGH POWER FACTOR

BACKGROUND OF THE INVENTION

1. Field of the Invention

The present invention relates to an electronic apparatus, and more particularly, to a half-bridge converter having an improved power factor.

2. Description of the Related Art

In general, a rectifier receives an AC power and outputs a DC power. A DC-DC converter converts a DC current to an AC current, boosts or steps down the AC current, and then rectifies the AC current. Among DC-DC converters, there are a pulse width modulation converter, a quasi-resonant converter, and a multi-resonant converter.

Since electronic apparatuses change sensitively to the ripple characteristic of a DC power voltage, studies for reducing the ripples in an output DC power have been actively carried out. For this purpose, a condenser-input rectifying method is used to convert an AC power to a DC power. In this method, a full-bridge rectifier, consisted of diodes and a condenser having a large capacitance, is included in an input terminal.

However, if a condenser having a large capacitance is used, the power factor of an AC input terminal is lowered to 0.5–0.6 due to the charging current of the condenser. This is not preferable because if the power factor is lowered, the efficiency of the input terminal is degraded.

FIG. 1a is a diagram showing an embodiment of a prior art converter, and FIG. 1b is a waveform diagram for explaining the operation of the prior art converter.

Referring to FIG. 1a, during half a cycle, diodes D1 and D4 conduct, and during the remaining cycle, diodes D2 and D3 conduct, so the waveform of the output is as shown in FIG. 1b.

In interval [0, t1] where the output voltage rises, a charging current flows because a supplied voltage is greater than a voltage (Vc) being charged to the condenser (Cs). On the contrary, in interval [t1, t2] where the output voltage falls, the condenser discharges, and its time constant corresponds to the product of the load (RL) and the capacitance (Cs) of the condenser. The charging interval [0, t1] is much shorter than the interval [t1, t2]. Here, [a, b] represents an interval from a to b. However, due to the charging current of the condenser (Cs) which is used to reduce the ripples in the output voltage, the power factor of the converter shown in FIG. 1a is lowered. Also, since the input current flows only when the input voltage (Vi) is greater than the condenser voltage (Vc), the input current flows in pulse shape around the maximum value of the input voltage and therefore includes more harmonic components than a sinusoidal current.

To solve the problem, a power factor improving unit is introduced in the input part.

In the boost converter of discontinuous-current mode which is commonly used, an input current naturally follows the sinusoidal shape of the input voltage. However, only when the output voltage of the power factor improving unit is much greater than the maximum value of an the input voltage, the power factor is improved. Meanwhile, if the output voltage of the power factor improving unit increases, voltages applied to semiconductor devices also increase. Therefore, in order to stand this voltage stress, a semiconductor switch having a higher rated voltage should be used.

On the other hand, since in the semiconductor switch having a higher rated voltage the conducting resistance is also high, the conducting loss also increases. If the conducting loss increases, the efficiency of the entire system is degraded.

Therefore, it is desirable to provide a converter which reduces the conducting loss in a semiconductor device, improves the power factor of the input terminal, and thus improves the efficiency of the entire system.

SUMMARY OF THE INVENTION

To solve the above problems, it is an objective of the present invention to provide a converter having a high power factor in which the voltage of the switching unit of the converter is fed back to the input terminal of the converter so that the conducting loss occurring in the switching unit decreases and the power factor of the input terminal is improved.

To accomplish the objective of the present invention, there is provided a half-bridge converter having a bridge diode unit transmitting energy to a voltage smoothing capacitor; the voltage smoothing capacitor for storing energy provided by the bridge diode unit; and a switching unit having two switches serially connected between both ends of the voltage smoothing capacitor, in which the power factor improving unit for feeding the voltage of the common connection point of the switches forming the switching unit back to the common connection point of the input capacitors so as to change the input current according to the magnitude of the input voltage is further included.

It is preferable that the power factor improving unit has a feedback inductor for feeding the voltage of the common connection point of the switches forming the switching unit back to the common connection point of the input capacitors; and a coupling inductor of which a first winding is connected between one end of the input voltage and one end of the bridge diode unit, a second winding is connected between the other end of the input voltage and the other end of the bridge diode unit, and the first winding and the second winding are coupled.

It is preferable that the power factor improving unit has a coupling inductor of which a first winding is connected between one end of the input voltage and one end of the bridge diode unit, a second winding is connected between the other end of the input voltage and the other end of the bridge diode unit, and the first winding and the second winding are coupled; a first inductor for linearly changing the current between one end of the input voltage and the first winding of the coupling inductor; and a second inductor for linearly changing the current between the other end of the input voltage and the second winding of the coupling inductor, in which the common connection point of the switches forming the switching unit is connected to the common connection point of the input capacitors.

It is preferable that the power factor improving unit has a feedback inductor for feeding the voltage of the common connection point of the switches forming the switching unit back to the common connection point of the input capacitors.

It is preferable that the power factor improving unit has a first inductor for linearly changing the current between one end of the input voltage and one end of the bridge diode unit; and a second inductor for linearly changing the current between the other end of the input voltage and the other end of the bridge diode, in which the common connection point of the switches forming the switching unit is connected to the common connection point of the input capacitors.

Accordingly, the power factor of the input terminal is improved in the half-bridge converter according to the present invention.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1A:
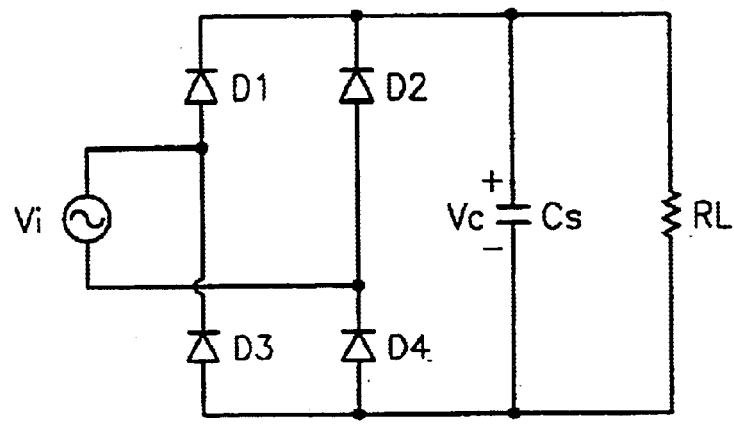
FIG. 1a is a diagram showing an embodiment of a prior art converter.
Figure 1B:
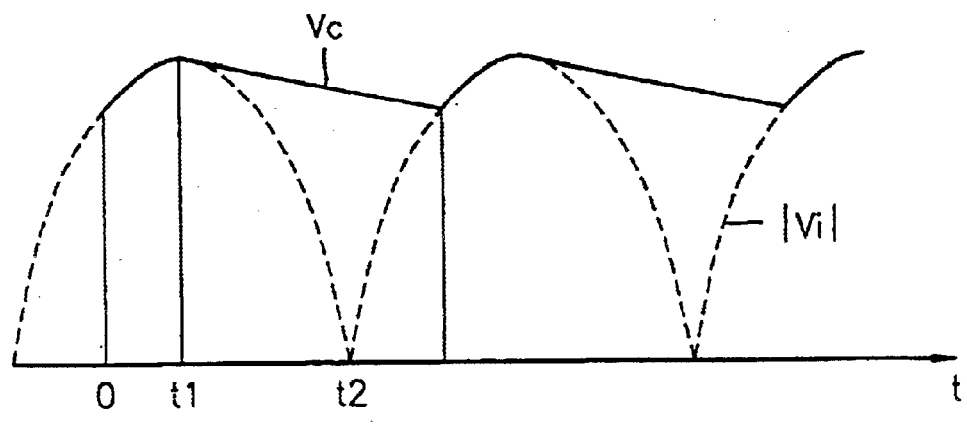
FIG. 1b is a waveform diagram for explaining the operation of the prior art converter.
Figure 2:
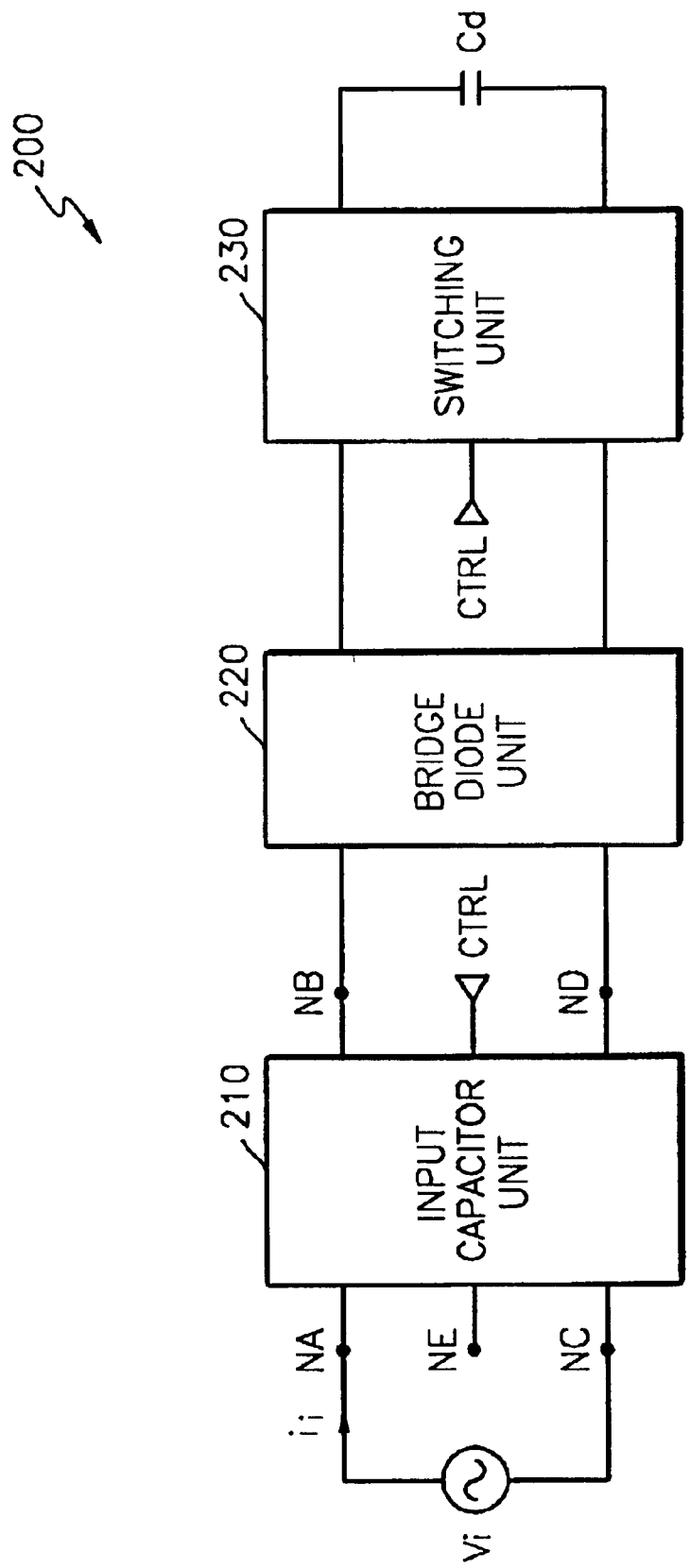
FIG. 2 is a schematic block diagram of a half-bridge converter according to the present invention.

FIG. 2 is a schematic block diagram of a half-bridge converter according to the present invention. The half-bridge converter includes an input voltage ($v_i$), a power factor improving unit 210, a bridge diode unit 220, a switching unit 230, and a smoothing capacitor (Cd).

The bridge diode unit 220 provides a current path to the power factor improving unit 210 and transmits energy to the smoothing capacitor (Cd). The smoothing capacitor (Cd) stores the energy transmitted from the bridge diode unit 220. The switching unit 230 includes two switches serially connected to both ends of the smoothing capacitor (Cd). The power factor improving unit 210 includes two input capacitors for supplying an input voltage, and it is connected between a common connection point of switches forming the switching unit 230 and each end of the input voltage ($v_i$). The common connection point of the switches forming the switching unit (230) is fed for feedback to the common connection point of the input capacitors so that an input current ($i_i$) can be increased or decreased according to the magnitude of the input voltage ($v_i$).

The switching unit 230 is complementarily turned on according to a duty ratio, and may include two switches serially connected to each other. By this duty ratio, the output power of the half-bridge converter 200 shown in FIG. 2 is adjusted. In addition, the switches forming the switching unit 230 performs a single-stage power control function for controlling an output power and at the same time improving the power factor of the input terminal. A variety of preferred embodiments of the power factor improving unit 210 will now be explained in detail referring to the drawings.

Figure 3:
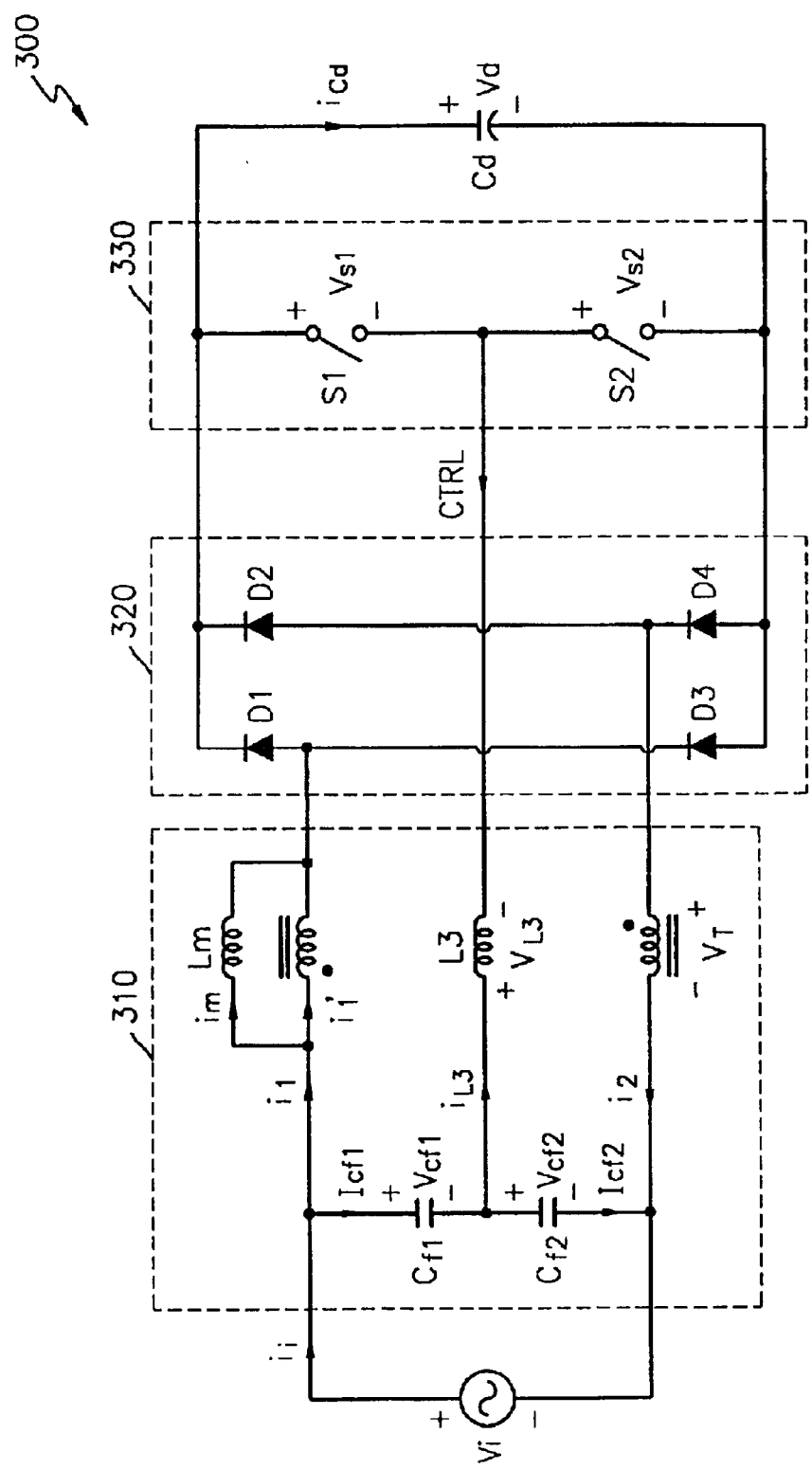
FIG. 3 is a circuit diagram of a preferred embodiment of the present invention.

FIG. 3 is a circuit diagram of a preferred embodiment of the present invention.

The half-bridge converter 300 shown in FIG. 3 includes an input voltage ($v_i$), a power factor improving unit 310, a bridge diode unit 320, a switching unit 330, and a smoothing capacitor (Cd). The bridge diode unit 320 includes four diodes D1 through D4 which are connected in the form of a full bridge. The switching unit 330 includes two switches S1 and S2 which are serially connected to both ends of the smoothing capacitor (Cd). The power factor improving unit 310 includes two input capacitors ($C_{f1}$, $C_{f2}$) for supplying the input voltage ($v_i$) and performing smoothing operations; a feedback inductor (L3) for feeding the voltage of the common connection point of the switches (S1, S2) back to the common connection point of the two input capacitors ($C_{f1}$, $C_{f2}$); and a coupling inductor (T1) in which a first winding is connected between one end of the input voltage ($v_i$) and one end of the bridge diode unit 320, a second winding is connected between the other end of the input voltage ($v_i$) and the other end of the bridge diode unit 320, and the first winding and the second winding are coupled with each other. For convenience of explanation, it is assumed that the magnetizing inductance Lm of the coupling inductor (T1) is high enough for a stable flow of a current, and the turn ratio between the first winding and the second winding is 1:1. However, this modeling is just for convenience of explanation on the operation of a device and not for limiting the scope of the present invention.

The operation of the half-bridge converter 300 shown in FIG. 3 will now be explained in detail.

First, it is assumed that the first switch is turned on. Then, the first diode (D1) is turned on and a constant current flowing through the first winding and the second winding of the coupling inductor (T1) begins to decrease. In this case, since both the first diode (D1) and the fourth diode (D4) conduct, the voltage ($v_T$) between both ends of the coupling inductor (T1) is constant and the size of the voltage ($v_{L3}$) applied to both ends of the feedback inductor (L3) is kept to be constant. Therefore, the current flowing through the first winding and the second winding of the coupling inductor (T1) and the current flowing through the feedback inductor (L3) change linearly. If the current flowing through the first winding and the second winding decrease down to '0', the fourth diode (D4) is turned off, and the constant current flowing through the magnetizing inductance (Lm) of the coupling inductor (T1) is all flowing through the feedback inductor (L3). In this process, the input current ($i_i$) supplied from the input voltage ($v_i$) is always 0.5 times the current flowing constant through the magnetizing inductance (Lm), and the current flowing constant through the magnetizing inductance (Lm) is in proportion to the input voltage. Therefore, the input current ($i_i$) increases or decrease with respect to changes of the input voltage ($v_i$).

Figure 4:
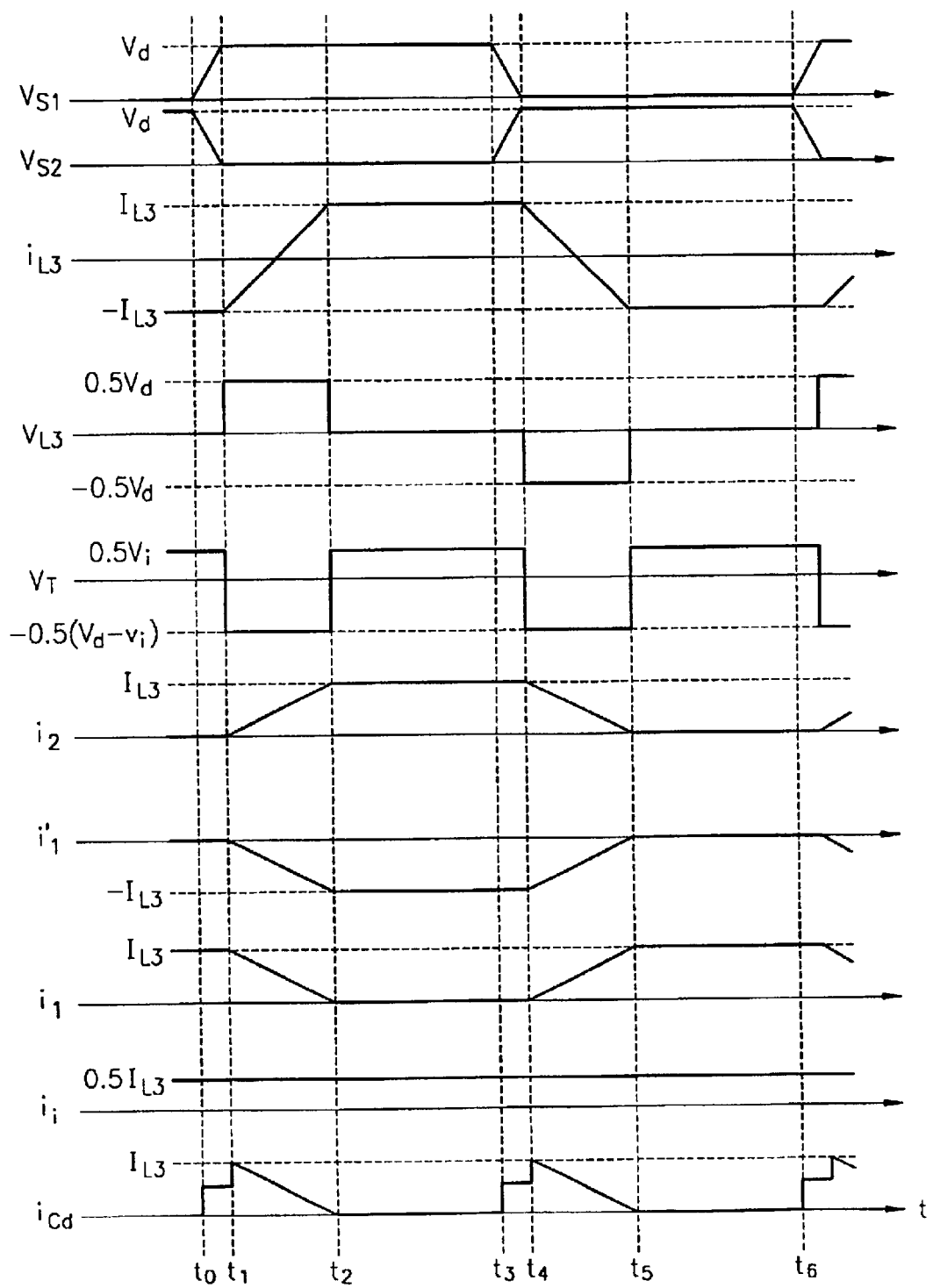
FIG. 4 is a waveform diagram for explaining the operation of each component of the half-bridge converter shown in FIG. 3.

FIG. 4 is a waveform diagram for explaining the operation of each component of the half-bridge converter shown in FIG. 3

First, it is assumed that before time $t_0$ the first switch (S1) is turned on and the second switch (S2) is turned off. Now, the first switch (S1) begins to be turned off at time $t_0$ and continues to be turned off until time $t_1$. Therefore, the voltage ($v_{S1}$) of the first switch (S1) increases from '0' to the voltage (Vd) of the smoothing capacitor (Cd). Meanwhile, the voltage ($v_{S2}$) of the second switch (S2) decreases from the voltage (Vd) to '0'. Before time $t_0$, the current ($i_{L3}$)

flowing through the feedback inductor (L3) is the minimum value $-I_{L3}$, and from $t_1$, to $t_2$, linearly increases to be the maximum value $+I_{L3}$. After time $t_2$, all the constant current flowing through the magnetizing inductance (Lm) of the coupling inductor (T1) flows to the feedback inductor (L3) and the voltage of the feedback inductor (L3) becomes '0'. The reason why the current ($i_{L3}$) flowing through the feedback inductor (L3) changes to be linear is that the voltage of the coupling inductor (T1) is constant and the voltage of the feedback inductor (L3) is also constant, as described above.

The voltage ($v_T$) between both ends of the second winding of the coupling inductor (T1) at $[t_1, t_2]$ is obtained as follows. First, since the first switch (S1) is turned on and the second switch (S2) is turned off before time $t_0$, if Kirchoff's Voltage Law (KVL) is applied to the first input capacitor ($C_{f1}$), the coupling inductor (T1) and the feedback inductor (L3), the following equation 1 is obtained:

$$v_T = v_{Cf1} + v_{L3} \quad (1)$$

For convenience of explanation, the voltage drop of the first diode (D1) is neglected, but this does not limit the scope of the present invention. Meanwhile, if it is assumed that the voltage ($v_{L3}$) of the feedback inductor (L3) is '0' and the capacities of the input capacitors ($C_{f1}$, $C_{f2}$) are the same before time $t_1$, $v_T$ has a constant value of $0.5\ v_i$. If a switching operation is performed and arrives at time $t_2$, the first switch (S1) is turned off, the second switch (S2) is turned on, and the first diode (D1) and the fourth diode (D4) are turned on. Therefore, if KVL is applied to the input voltage source ($v_i$), the coupling inductor (T1) and the smoothing capacitor ($V_d$), then the following equation 2 is obtained:

$$v_T = -0.5(V_d - v_i) \quad (2)$$

That is, $v_T$ has a constant value of $-0.5(V_d-v_i)$. At this time, the voltage ($v_{L3}$) of the feedback inductor (L3) satisfies the following equation 3:

$$v_{L3} = v_{Cf2} - v_T \quad (3)$$

At this time, since the voltage ($v_{Cf2}$) of the second input capacitor ($C_{f2}$) is $0.5\ v_i$, and $v_T$ is $-0.5(V_d-v_i)$, the voltage ($v_{L3}$) of the feedback inductor (L3) has a constant value of $0.5V_d$. Therefore, the slope of the current ($i_{L3}$) flowing through the feedback inductor (L3) at $[t_1, t_2]$ is $0.5\ V_d/L3$.

Also, the relation between the current ($i_{L3}$) flowing through the feedback inductor (L3) and the current ($i_2$) flowing through the coupling inductor (T1) is as the following equation 4:

$$i_2 = i_{L3} + i_1' + i_m \quad (4)$$

Therefore, the current ($i_2$) at $[t_1, t_2]$ constantaly increases and arrives at the maximum value of the current ($i_{L3}$) flowing through the feedback inductor (L3). Meanwhile, since the transiting current ($i_2$) is the reverse phase of the current ($i_1'$) flowing through the first winding of the coupling inductor (T1) and the current ($i_m$) flowing through the magnetizing inductance (Lm) has a constant value of ($+I_{L3}$), $i_1$ is obtained by the following equation 5:

$$i_1 = i_m + i_1' \quad (5)$$

Also, because of the symmetry of the input capacitors, the current flowing through the first input capacitor ($C_{f1}$) satisfies the following equation 6:

$$i_{Cf1} = \frac{1}{2} i_{L3} \quad (6)$$

In addition, since $i_i = i_1 + i_{Cf1}$, the current ($i_i$) supplied by the input voltage source has a constant value of $0.5 I_{L3}$.

In conclusion, the value of the current ($i_i$) is constant in the entire intervals of the switching period, and since the waveform of the input current ($i_i$) changes with respect to the input voltage ($v_i$), the power factor improves.

The power factor improving unit 310 of the circuit shown in FIG. 3 does not limit the scope of the present invention. Rather, it is possible to build a structure in which the voltage of the common connection point of the switches forming the switching unit is fed back to the common connection point of the input capacitors so that the input current ($i_i$) changes with respect to the input voltage ($v_i$). Therefore, a variety of preferred embodiments of the power factor improving unit 310 of the present invention will now be explained.

Figure 5:
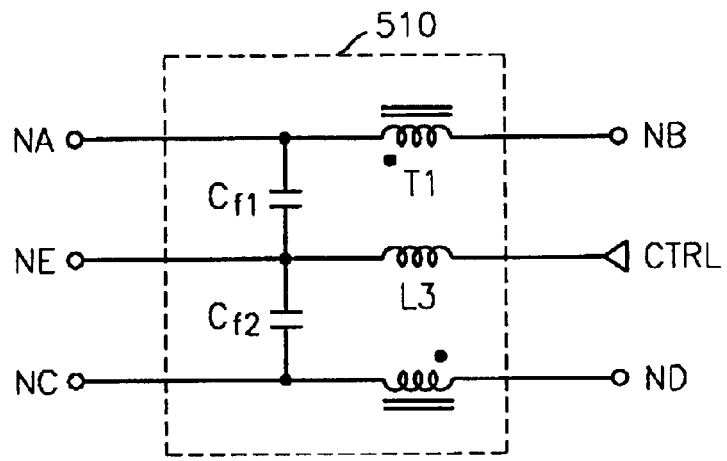
FIG. 5 is a diagram of a first preferred embodiment of a power factor improving unit mounted in a half-bridge converter according to the present invention.

FIG. 5 is a diagram of a first preferred embodiment of a power factor improving unit mounted in a half-bridge converter according to the present invention.

The power factor improving unit 510 of FIG. 5 includes a coupling inductor (T1) in which the first winding is connected between one end (NA) of the input voltage (not shown) and one end (NB) of the bridge diode unit (not shown), the second winding is connected between the other end (NC) of the input voltage and the other end (ND) of the bridge diode unit, and the first winding and the second winding are coupled each other. The power factor improving unit 510 also includes a feedback inductor (L3) which feeds the common connection point (CTRL) of the switching unit to the common connection point (NE) of the input capacitors.

The operation of the power factor improving unit 510 of FIG. 5 is shown in FIG. 4.

Figure 6:
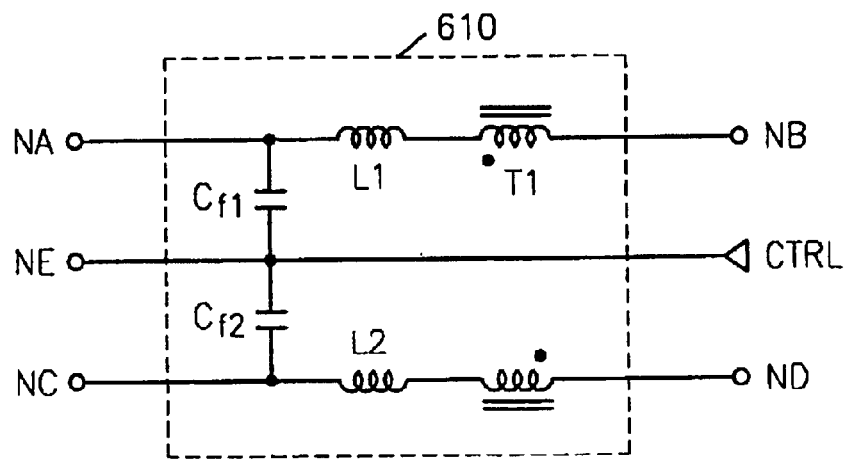
FIG. 6 is a diagram of a second preferred embodiment of a power factor improving unit mounted in a half-bridge converter according to the present invention.

FIG. 6 is a diagram of a second preferred embodiment of a power factor improving unit mounted in a half-bridge converter according to the present invention.

The power factor improving unit 610 of FIG. 6 includes a coupling inductor (T1), in which the first winding is connected between one end (NA) of the input voltage (not shown) and one end (NB) of the bridge diode unit (not shown), the second winding is connected between the other end (NC) of the input voltage and the other end (ND) of the bridge diode unit, and the first winding and the second winding are coupled each other, a first inductor (L1) for linearly changing the current between one end (NA) of the input voltage and the first winding of the coupling inductor, and a second inductor (L2) for linearly changing the current between the other end (NB) of the input voltage and the second winding of the coupling inductor. The common connection point (CTRL) of the switching unit is connected to the common connection point (NE) of the input capacitors.

The operation of the power factor improving unit 610 of FIG. 6 is similar to that of the power factor improving unit 310 of FIG. 3, except that the voltage which is constantly applied to the feedback inductor (L3) of the power factor improving unit 310 of FIG. 3 is applied to the first and second inductors (L1, L2). Therefore, for simplification, the explanation on the operation of the power factor improving unit 610 will be omitted.

Figure 7:
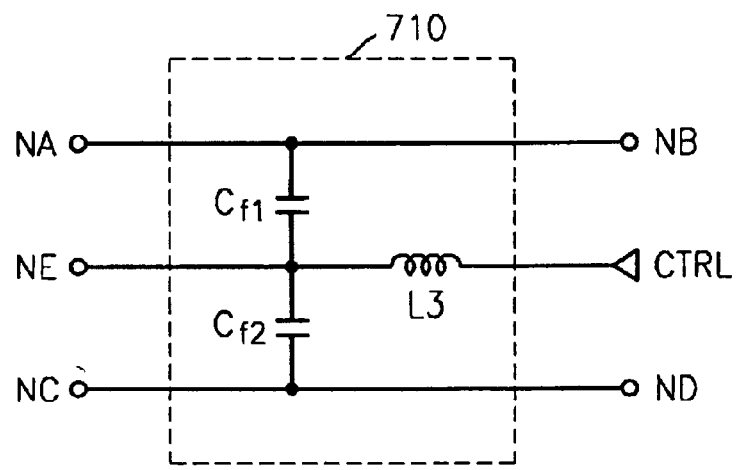
FIG. 7 is a diagram of a third preferred embodiment of a power factor improving unit mounted in a half-bridge converter according to the present invention.

FIG. 7 is a diagram of a third preferred embodiment of a power factor improving unit mounted in a half-bridge converter according to the present invention.

The power factor improving unit 710 of FIG. 7 includes a feedback inductor (L3) for feeding the common connection point (CTRL) of the switching unit to the common connection point (NE) of the input capacitors.

The operation of the power factor improving unit 710 of FIG. 7 is similar to that of the power factor improving unit 610 of FIG. 6, except that the first and second inductors (L1, L2) for linearly changing the current of the power factor improving unit 610 of FIG. 6 is replaced by the feedback inductor (L3) in the power factor improving unit 710 of FIG. 7. Therefore, for simplification, the explanation on the operation of the power factor improving unit 710 will be omitted.

Figure 8:
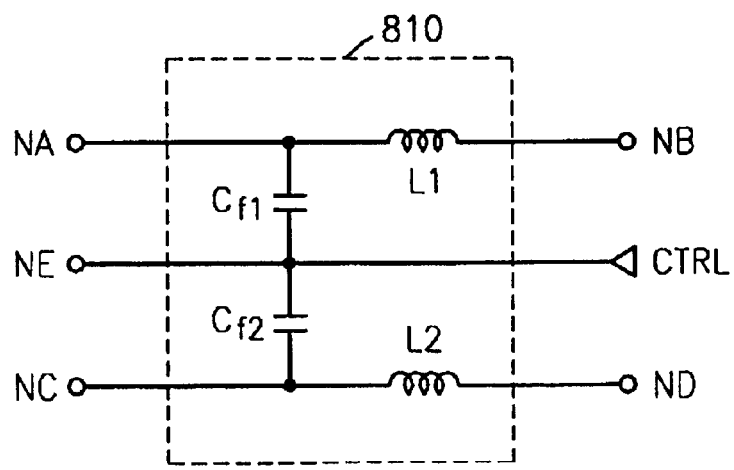
FIG. 8 is a diagram of a fourth preferred embodiment of a power factor improving unit mounted in a half-bridge converter according to the present invention.

FIG. 8 is a diagram of a fourth preferred embodiment of a power factor improving unit mounted in a half-bridge converter according to the present invention.

The power factor improving unit 810 of FIG. 8 includes a first inductor (L1) for linearly changing the current between one end (NA) of the input voltage (not shown) and one end (NB) of the bridge diode unit, and a second inductor (L2) for linearly changing the current between the other end (NC) of the input voltage and the other end (ND) of the bridge diode unit. The voltage of the common connection point (CTRL) of the switching unit is fed back to the common connection point (NE) of the input capacitors.

The operation of the power factor improving unit 810 shown in FIG. 8 is similar to that of the power factor improving unit 610 of FIG. 6. In the power factor improving unit 810 of FIG. 8, the first and second inductors (L1, L2) also linearly change the current. Therefore, for simplification, the explanation on the operation of the power factor improving unit 810 will be omitted.

Figure 9:
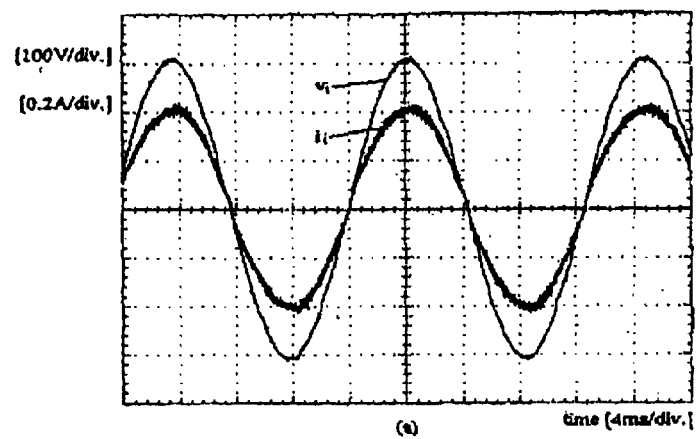
FIG. 9 is a graph for showing experimental waveforms of the half-bridge converter shown in FIG. 3.
Figure 9:
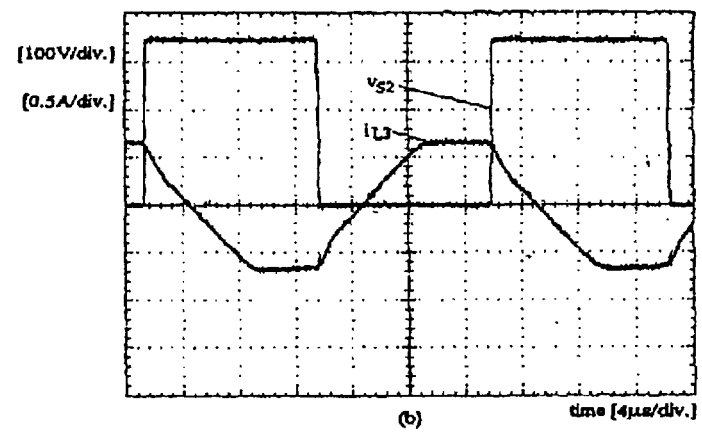
Figure 9:
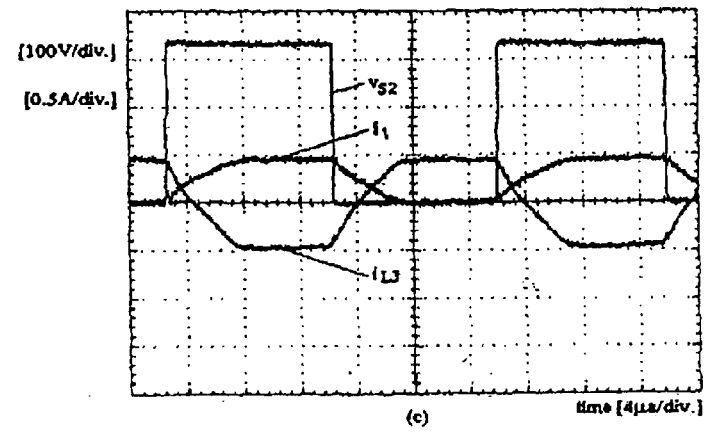

FIG. 9 is a graph for showing experimental waveforms of the half-bridge converter shown in FIG. 3. As shown in FIG. 9, since the input current practically follows the waveform of the input voltage, the power factor measured by the experiment is greater than 0.99.

So far, optimum embodiments are explained in the drawings and specification, and though specific terminologies are used here, those were only to explain the present invention. For example, the switching unit of the present invention is explained to have two switches serially connected and to be complementarily turned on. However, for preferable operation of the switches, semiconductor devices such as a Metal Oxide Semiconductor Field Effect Transistor (MOSFET) may be employed as a switching device. Also, an Insulated Gate Bipolar Transistor (IGBT) having a lower loss rate, and higher voltage and current rating may be employed as a switch. Therefore, the present invention is not restricted to the above-described embodiments and many variations are possible within the spirit and scope of the present invention. The scope of the present invention is not determined by the description but by the accompanying claims. According to the present invention, there is provided a converter having a high power factor, in which by feeding the voltage of the switching unit back to the input terminal, a device having a low voltage and current rating is used as a switching device so that conducting loss occurring in the switching unit decrease and the power factor of the input terminal is improved.

What is claimed is:

1. A half-bridge converter comprising:
    a bridge diode unit for providing a current path to a power factor improving unit and transmitting energy to a voltage smoothing unit;
    the voltage smoothing unit for storing energy provided by the bridge diode unit;
    a switching unit having two switches serially connected between both ends of the voltage smoothing unit, the power factor improving unit feeding the voltage of the common connection point of the switches forming the switching unit back to the common connection point of the input capacitors; and
    a waveform signal of an input current changing with respect to an input voltage such that the power factor is improved, the waveform signal of the input current being constant during the switching interval.

2. The half-bridge converter of claim 1 wherein the power factor improving unit comprises:
    a feedback inductor for feeding the voltage of the common connection point of the switches forming the switching unit back to the common connection point of the input capacitors; and
    a coupling inductor of which a first winding is connected between one end of the input voltage and one end of the bridge diode unit, a second winding is connected between the other end of the input voltage and the other end of the bridge diode unit, and the first winding and the second winding are coupled each other.

3. The half-bridge converter of claim 1, wherein the power factor improving unit comprises:
    a coupling inductor of which a first winding is connected between one end of the input voltage and one end of the bridge diode unit, a second winding is connected between the other end of the input voltage and the other end of the bridge diode unit, and the first winding and the second winding are coupled each other;
    a first inductor for linearly changing the current between one end of the input voltage and the first winding of the coupling inductor; and
    a second inductor for linearly changing the current between the other end of the input voltage and the second winding of the coupling inductor,
    wherein the common connection point of the switches forming the switching unit is connected to the common connection point of the input capacitors.

4. The half-bridge converter of claim 1, wherein the power factor improving unit comprises:
    a feedback inductor for feeding the voltage of the common connection point of the switches forming the switching unit back to the common connection point of the input capacitors.

5. The half-bridge converter of claim 1, wherein the power factor improving unit comprises:
    a first inductor for linearly changing the current between one end of the input voltage and one end of the bridge diode unit; and
    a second inductor for linearly changing the current between the other end of the input voltage and the other end of the bridge diode,
    wherein the common connection point of the switches forming the switching unit is connected to the common connection point of the input capacitors.

* * * * *